Jan. 20, 1959
W. BRANDL
2,869,451
APPLIANCE FOR PREPARING HOT BEVERAGES
Filed Feb. 2, 1955
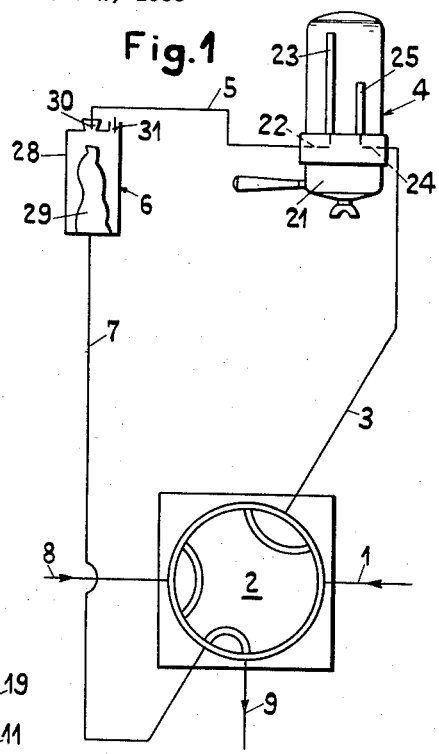
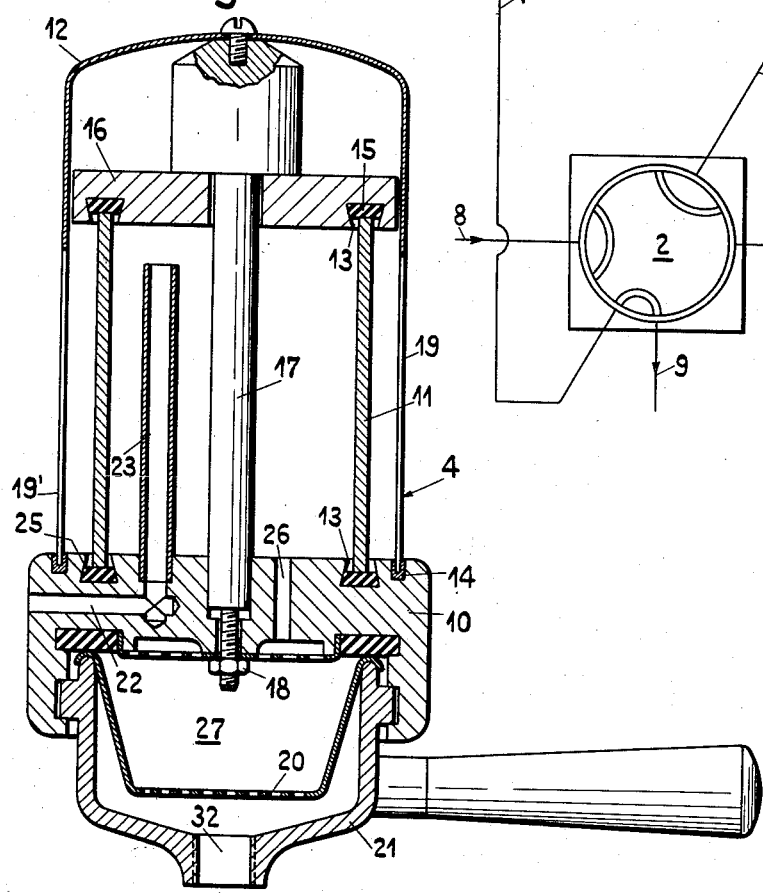

United States Patent Office 2,869,451
Patented Jan. 20, 1959

2,869,451

APPLIANCE FOR PREPARING HOT BEVERAGES

Wilhelm Brandl, Zurich, Switzerland

Application February 2, 1955, Serial No. 485,768

Claims priority, application Switzerland
February 11, 1954

1 Claim. (Cl. 99—302)

The present invention relates to an appliance for preparing hot beverages by the infusion of substances of the group consisting of coffee and tea and the substitutes thereof with boiling water, and has the main object of providing an appliance in which the hot water is displaced by air pressure.

With these and other objects in view I provide an appliance of the kind referred to, comprising in combination: a cylinder, a pan for the substance to be infused in communication with the said cylinder through a bore, supply means in communication with the said cylinder and with an external source of boiling water adapted to fill the said cylinder with boiling water, and supply means in communication with the top of the said cylinder and with an external source of air under pressure adapted to introduce said air into the said cylinder above the level of the hot water contained therein, and to force the said hot water through the said bore into the said pan containing the substance to be infused.

Preferably the said cylinder consists of transparent material, such as glass, and has a base plate through which the said supply means for the boiling water and for the air under pressure are in communication with the said cylinder. The same may have a top plate and a screw bolt and nut securing the said top plate, cylinder and base plate tightly together.

Conveniently a casing having at least one elongated window, surrounding said cylinder, is mounted on the said base plate, permitting to watch the water level in the said cylinder from outside.

Preferably the said supply means for air under pressure comprise hydraulically controlled air displacer means, which may consist of a casing in communication with the top of the said cylinder, preferably through a non-return valve opening outwardly with respect to said casing and having a suction valve opening inwardly in communication with the ambient atmosphere, and a flexible bag arranged inside the said casing and adapted to be put in communication with an external source of water pressure.

Conveniently the supply of boiling water, and of air under pressure displacing said water from the said cylinder is controlled by a single multi-way control valve having a first position connecting the said cylinder to the said hot water supply means, a second position connecting the said air displacer means with an external source of water pressure, and a third position, connecting the said air displacer means to water drain.

Preferably two vertical tubes are fitted into the said base plate, one of the said tubes being connected to the said supply means for hot water, the other one to the said air displacer means issuing at a higher level in the said cylinder than the first mentioned tube.

These and other objects and features of my invention will be clearly understood from the following description of a preferred embodiment thereof given by way of example with reference to the accompanying drawing, in which:

Fig. 1 is a diagrammatic general arrangement, and
Fig. 2 is a sectional elevation of the infusion device of the appliance according to the present invention.

The hot water supply to the infusion device 4 is effected through a control valve 2 and a pipe 3. The infusion device 4 is connected through a pipe 5 with the air displacer means 6, and the latter by a pipe 7 and the said control valve 2 either to the cold water supply pipe 8 or to the drain 9.

On the base plate 10 of the infusion device 4 (Fig. 2) a glass cylinder 11 and a casing 12 are fitted into circular grooves 13, 14, respectively. In the groove 13 a packing ring 15 is arranged. The cylinder 11 carries a closure plate 16 having a groove 13' and a packing ring 15' located therein. This plate is fixedly connected to the base plate 10 by means of a bolt 17 and nut 18. The casing 12 has two slot-shaped windows 19, 19'.

The base plate 10 is provided in the usual manner with a filter pan 21 having a filter sieve 20. A compressed air supply pipe 5 is connected to a bore 22 which is in communication with a tube 23. Likewise the hot water pipe 3 is connected with a bore 24 and a tube 25 (Fig. 1). The tube 23 is longer than the tube 25. Bores 26 (one of which only is shown in Fig. 2) connect the interior of the glass cylinder 11 with the filter pan 21. The latter has discharge opening 32 for the beverage.

The pipe 7 is connected to the interior of a rubber bag or bellows 29 arranged in the casing 28 of the said air displacer means 6 (Fig. 1), and this casing is connected through a non-return valve 30 to the said pipe 5, and through a suction valve 31 with the ambient atmosphere.

The appliance described hereinabove operates as follows:

After coffee powder, for example, has been inserted into the space 27 within the filter sieve 20 (Fig. 2), the control valve 2 (Fig. 1) is so positioned that communication is established between the pipes 1 and 3. The valve 2 is kept in this position until the desired quantity of hot water has flown through pipe 3 and tube 25 into the cylinder 11 of the infusion device 4. Thereafter the valve 2 is so adjusted as to establish communication between the pipes 8 and 7. Accordingly cold water flows from pipe 8 through pipe 7 into the rubber bag 29. The air contained in the casing 28 is displaced by the expanding bag 29, and flows through the non-return valve 30 and pipe 5 likewise into the glass cylinder 11, and forces the hot water from the said cylinder through the bore 26 and the space 27 into the powdered coffee, the infusion flowing off through the discharge opening 32 into the cup (not shown).

The valve 2 is then put into the rest position (as shown in Fig. 1) in which the pipe 7 is connected to the drain pipe 9, whereby the water flows off the bag 29. Air is sucked thereby into the container 28 through the suction valve 31. The appliance is then ready for another cycle of operations.

While I have herein described and illustrated in the accompanying drawings what may be described as a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent, is:

An appliance for preparing hot beverages by the infusion of substances of the group consisting of coffee and tea and substitutes thereof with boiling water comprising in combination: a cylinder having a base plate with a bore therethrough, a pan having a filter sieve therein for the substance to be infused supported by said base plate under said cylinder and in communication with said cylinder through said bore, a discharge opening in said pan, an external source of boiling water, conduit means leading directly into said cylinder and by-passing said pan and sieve and adapted for connection with said source for filling said cylinder with boiling water, a separate external source of fluid under pressure, hydraulically controlled air displacer means including an expansible and contractible bellows member operatively associated with said cylinder for causing air under pressure to be introduced into said cylinder, separate conduit means in communication with said bellows member and adapted for connection with said separate external source of fluid under pressure for actuating said air displacer means, and a multi-way control valve arranged between both said conduit means and their respective associated external sources adapted to selectively connect said sources with their respective conduit means, whereby said cylinder may be first filled with plain boiling water and then air under pressure introduced thereinto to force said water through said bore into said pan and finally out said discharge opening as prepared beverage.

References Cited in the file of this patent

UNITED STATES PATENTS

| | | |
|---|---|---|
| 423,127 | Childs | Mar. 11, 1890 |
| 776,106 | Beuirier | Nov. 29, 1904 |
| 1,229,539 | Sparboom | June 12, 1917 |
| 1,409,123 | Simonton | Mar. 7, 1922 |
| 1,623,049 | Dorsey | Apr. 5, 1927 |
| 1,662,547 | Urtis | Mar. 13, 1928 |
| 2,613,607 | Sheen et al. | Oct. 14, 1952 |

OTHER REFERENCES

| | | |
|---|---|---|
| 18,168 | Great Britain | Oct. 19, 1916 |
| 202,219 | Switzerland | Apr. 1, 1939 |
| 282,677 | Germany | Mar. 16, 1915 |
| 438,184 | Great Britain | Nov. 12, 1935 |
| 453,128 | Italy | Nov. 17, 1949 |